United States Patent [19]

Shigehara

[11] Patent Number: 4,942,608
[45] Date of Patent: Jul. 17, 1990

[54] PATTERN RECOGNITION APPARATUS USING A COMPOSITE SIMILARITY METHOD

[75] Inventor: Hiroshi Shigehara, Tokyo, Japan

[73] Assignee: Kabushiki Kaisha Toshiba, Kawasaki, Japan

[21] Appl. No.: 158,913

[22] Filed: Feb. 22, 1988

[30] Foreign Application Priority Data

Feb. 23, 1987 [JP] Japan .................................. 62-39587

[51] Int. Cl.$^5$ .............................................. G10L 5/00
[52] U.S. Cl. ..................................... 381/43; 364/513.5
[58] Field of Search ...................................... 381/41–43; 364/513.5

[56] References Cited

U.S. PATENT DOCUMENTS

| | | | |
|---|---|---|---|
| 3,688,267 | 8/1972 | Iijima et al. | 382/36 |
| 4,752,957 | 6/1988 | Maeda | 381/42 |
| 4,783,806 | 11/1988 | Nakamura et al. | 381/43 |

Primary Examiner—Emanuel S. Kemeny
Attorney, Agent, or Firm—Finnegan, Henderson, Farabow, Garrett, and Dunner

[57] ABSTRACT

A pattern recognition apparatus is constituted by a feature data extraction section, a RAM for storing feature data, a memory for storing standard pattern data, an arithmetic section for performing a similarity measurement calculation between input pattern data and the standard pattern data, based on a multiple similarity method, and a controller for recognizing an input signal, based on the calculation result from the arithmetic section. The arithmetic section is constituted by: a bus, a first multiplexer for selecting any of the feature data, data on the data bus, and a constant, a second multiplexer for selecting any of the feature data, the standard pattern data, and data on the data bus, first and second registers for storing output data from the first multiplexer and from the second multiplexer, respectively, a partial product generator for generating partial products of the data stored in the first and second registers, a shifter for shifting the partial products by a predetermined number of bits, a digital adder for adding the output data from the shifter to other data, and outputting the addition result onto the data bus, a third register for storing the output data from the adder, and a third multiplexer for selecting one of the data stored in the third register and output data of the adder, and supplying the data selected, as the other data, to the adder, for the adder to perform an accumulation operation.

10 Claims, 12 Drawing Sheets

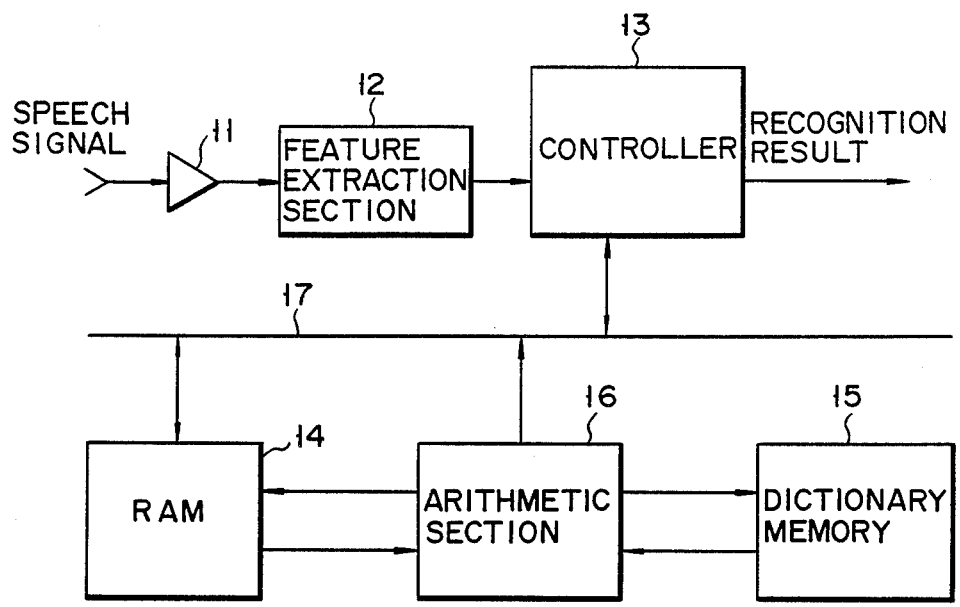
F I G. 4
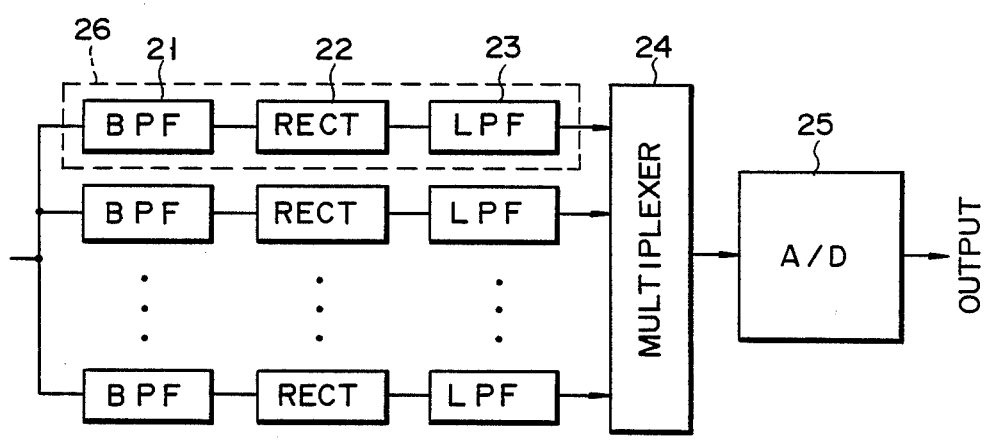
F I G. 5

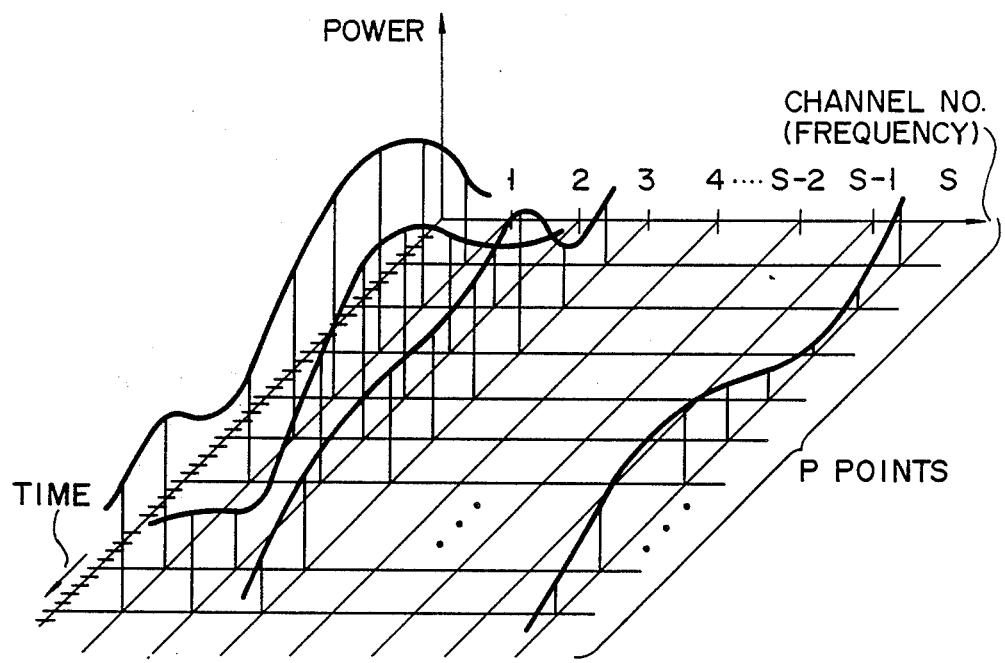
F I G. 6

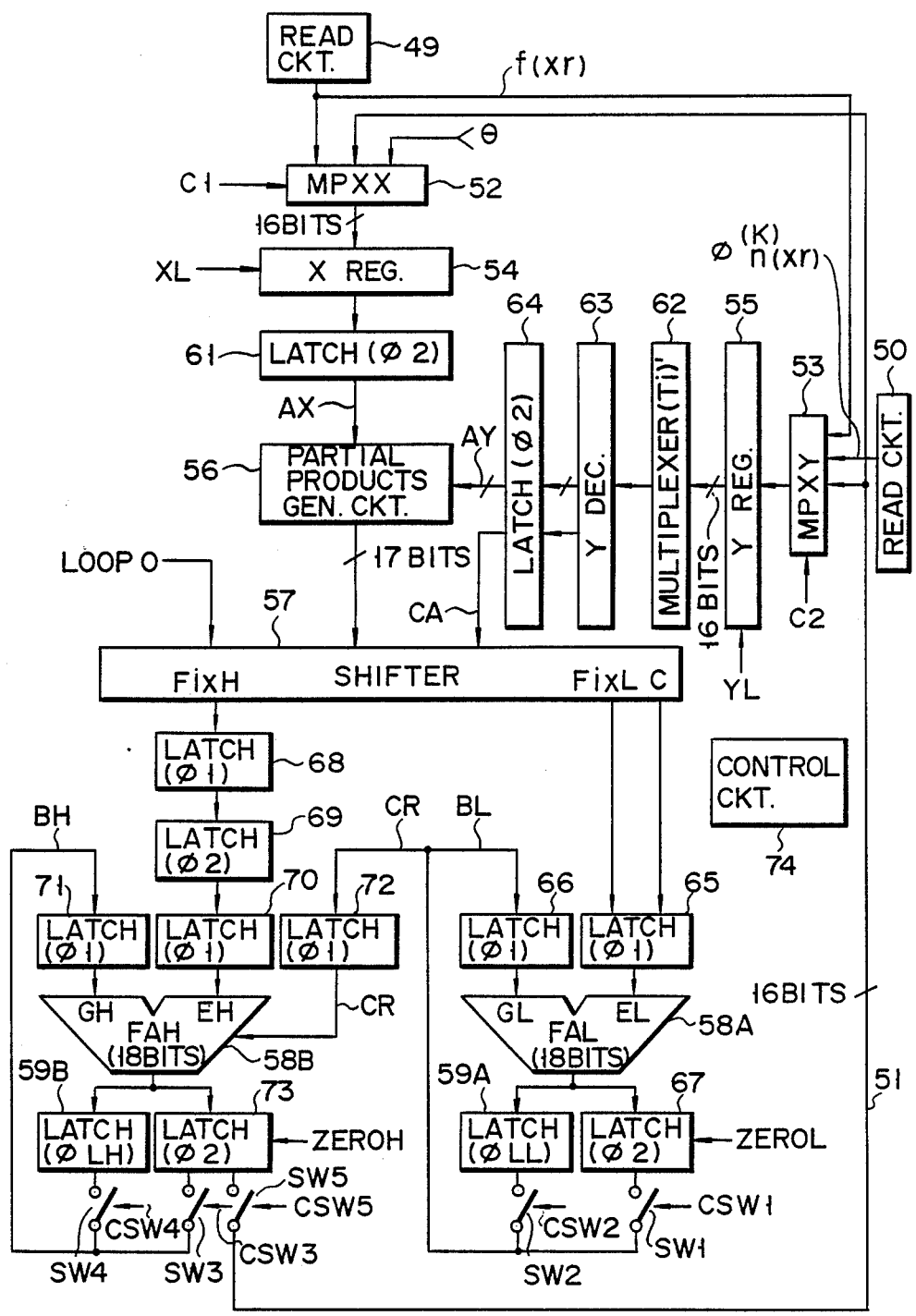
F I G. 8

| y2i | y2i+1 | y2i+2 | A | B | C | C·A | (PP)i |
|---|---|---|---|---|---|---|---|
| 0 | 0 | 0 | 0 | 0 | 0 | 0 | 0 |
| 1 | 0 | 0 | 1 | 0 | 0 | 0 | X |
| 0 | 1 | 0 | 1 | 0 | 0 | 0 | X |
| 1 | 1 | 0 | 0 | 1 | 0 | 0 | +2X |
| 0 | 0 | 1 | 0 | 1 | 1 | 1 | −2X |
| 1 | 0 | 1 | 1 | 0 | 1 | 1 | −X |
| 0 | 1 | 1 | 1 | 0 | 1 | 1 | −X |
| 1 | 1 | 1 | 0 | 0 | 1 | 1 | 0 |

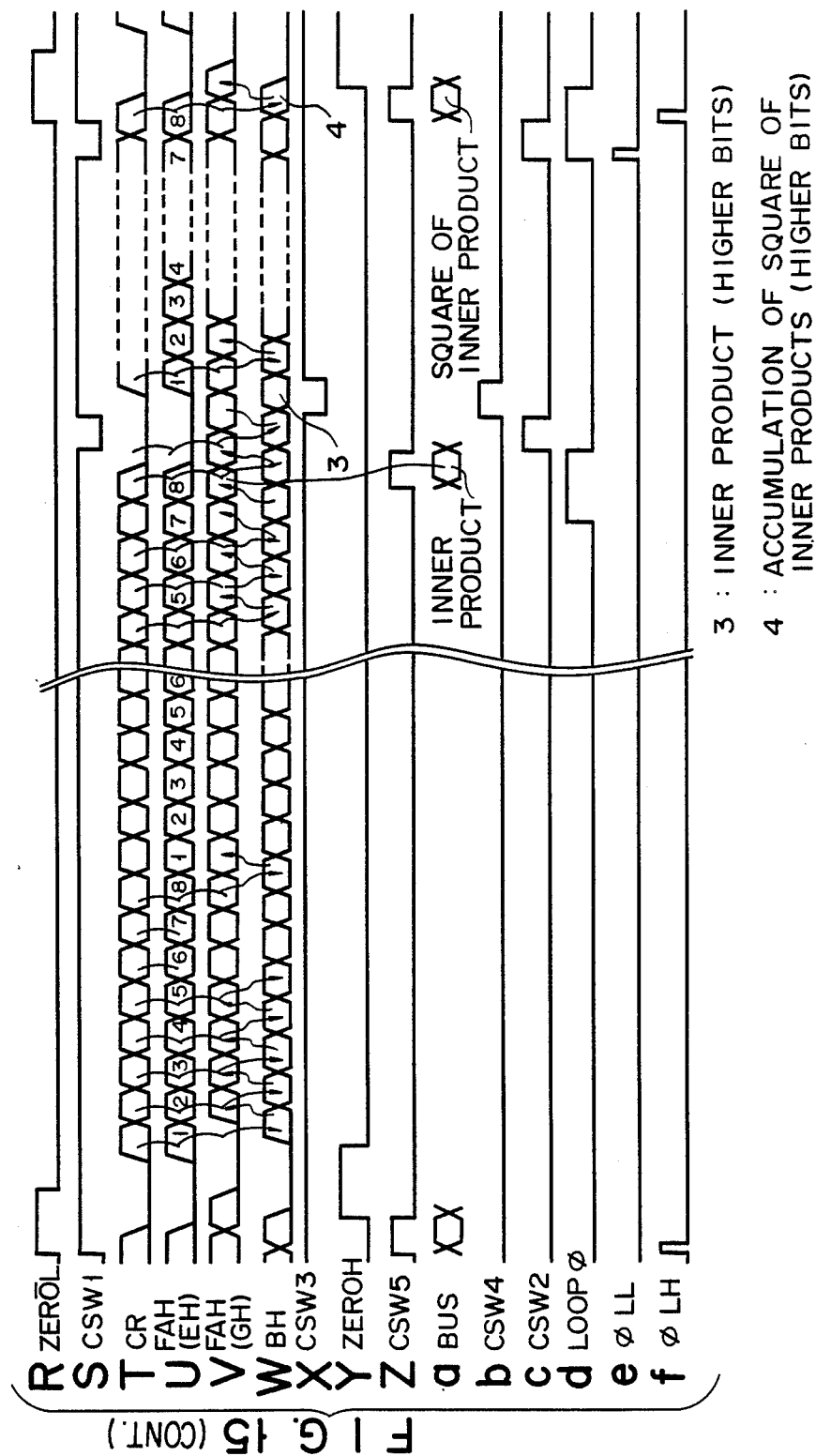

PATTERN RECOGNITION APPARATUS USING A COMPOSITE SIMILARITY METHOD

BACKGROUND OF THE INVENTION

1. Field of the Invention

The present invention relates to a pattern recognition apparatus which recognizes an input pattern by means of digital signal processing and, more particularly, to a pattern recognition apparatus using a multiple similarity method for recognizing an input pattern.

2. Description of the related art

A pattern recognition apparatus using a multiple similarity method is disclosed in, for example, U.S. Pat. No. 3,688,267. This apparatus will be described hereinafter.

A pattern to be recognized is assumed to be a function of x defined on region R, and is expressed by f(x). If an input pattern is a graphic pattern, region R is a two-dimensional plane, and x represents a two-dimensional position vector. Function f(x) represents the intensity, e.g., the density, of the graphic pattern at position x.

If an input pattern is a speech pattern, region R is then an orthogonal two-dimensional plane of a time axis and a frequency axis, and x represents a position vector thereon. Function f(x) represents the loudness of a speech signal at a given time and at a given frequency.

Function f(x) can be approximated by a set $\{f(xr)\}$ $$\overset{M}{\underset{r=1}{}}$$

of values of f(x) at finite (e.g., M) sampling points xr ($1 \leq r \leq M$). Multiple similarity $S^{(K)}(f)$ is given by following equation (1), using input pattern vector f and predetermined standard pattern vector $\phi$:

$$S^{(K)}(f) = \sqrt{\sum_{n=1}^{N} (f,\phi^{(k)}n)^2} / \sqrt{\|f\|^2} \quad (1)$$

where $(f,\phi^{(k)}n)$ is an inner product of input pattern vector f and standard pattern vector $\phi$, $$f = f(xr) \underset{r=1}{\overset{M}{}} = [f(x1),f(x2),\ldots,f(xM)]^T,$$

$$\phi^{(k)}n = [\phi^{(k)}n1,\phi^{(k)}n2,\ldots,\phi^{(k)}nM]^T$$

where k is the number of categories, for example, the number of words stored in memory for the purpose of speech recognition and $n = 1, 2, 3, \ldots, N$: where N is the number of standard patterns prepared for one category, e.g., corresponding to the number of standard patterns for a given word.

Multiple similarity $S^{(k)}(f)$ falls within the range expressed by relation (2):

$$0 \leq S^{(k)}(f) \leq 1 \quad (2)$$

As the value of multiple similarity $S^{(k)}(f)$ is closer to 1, input pattern f can be regarded as a pattern similar to standard pattern $\{\phi^{(k)}n\}$.

$$\overset{N}{\underset{n=1}{}}$$

If relation (3) is satisfied when $\epsilon$ is a small positive value, input pattern f and standard pattern $\phi$ can be considered to belong to an identical category:

$$S^{(k)}(f) > 1 - \epsilon \quad (3)$$

In U.S. Pat. No. 3,688,267, $\|f\|$ is constant. Therefore, if the value of $$\sum_{n=1}^{N}$$

$(f,\phi^{(k)}n)^2$ is maximum, it can be determined that the input pattern belongs to a kth category.

A circuit for calculating $$\sum_{n=1}^{N}$$

$(f,\phi^{(k)}n)^2$ and for detecting a category in which $$\sum_{n=1}^{N}$$

$(f,\phi^{(k)}n)^2$ becomes maximum will now be described, with reference to FIG. 1.

FIG. 1 is substantially the same block diagram as the circuit shown in FIG. 2 of U.S. Pat. No. 3,688,267. Inner product generating circuits 91, shown in FIG. 1, calculate the inner products $(f,\phi^{(k)}n)$ of input pattern vector f and standard pattern vectors $\phi$. The calculated inner products are supplied one to each of square circuits 92, where they are then squared. The squared inner products are supplied to adders 93 and are added together. The outputs from adders 93 are supplied to maximum value detector 94. Maximum value detector 94 has K output terminals 01, 02, ..., OK, and outputs a signal from an output terminal corresponding to a category for which the sum is the maximum.

The apparatus shown in FIG. 1 has, however, a disadvantage in that it requires a large number of hardware elements, i.e., K×N inner product generating circuits 91, K×N square circuits 92, and K adders 93. Each inner product generating circuit 91 is constituted by a multiplier and an adder. Each square circuit 92 comprises a multiplier. Therefore, the conventional apparatus shown in FIG. 1 requires at least M×K×N multipliers and K×N+K adders. If number N of standard patterns is 10, number M of sampling points is 16, and number K of words in the vocabulary is 10, the total number of multipliers is 1,600 (M×K×N=16 10×10=1600), and the total number of adders is 110 (K×N+K=10×10+10=110).

In the above-mentioned U.S. Pat. No. 3,688,267, multiplier 91 comprises an analog circuit constituted by operational amplifier 95, M resistors R1 to RM, and feedback resistor RF, as shown in FIG. 2. The adder 93 is obtained by setting the resistances of resistors R1 to RM and RF to be equal to each other. Square circuit 92 comprises an analog circuit constituted by diodes D and resistors 2R and R (see FIGS. 1b and 3 in U.S. Pat. No. 3,688,267), as shown in FIG. 3. When such circuits are used, if number N of standard patterns, number M of sampling points, and number K of words in the vocabulary are respectively 10, 16, and 10, multipliers 91 and adder 93 require 110 operational amplifiers and about 1,900 resistors. Square circuits 92 require 10 resistors R and 90 diodes D.

In this manner, in the apparatus described in U.S. Pat. No. 3,688,267, since, analog circuits are used a large number of hardware elements are required. For this reason, it is difficult to integrate this apparatus on one chip.

Another disadvantage of the apparatus disclosed in U.S. Pat. No. 3,688,267 is difficulty in circuit adjustments of the analog circuits. For example, resistances must be set to yield $RF/Rr = \phi^{(k)}n(r = 1, 2, \ldots, M)$. It is difficult to accurately set resistances. In the case of analog circuits, there are many factors to be considered and adjusted such as variations in characteristics, offsets, noise margin, and the like. Therefore, the conventional apparatus is not suitable for integration.

In the apparatus disclosed in U.S. Pat. No. 3,688,267, each standard pattern $\phi^{(k)}n$ is set by resistors R1 to RM. When standard patterns are modified, the resistances of $100 (= 10 \times 10)$ resistors must be changed. This means poor applicability of the apparatus to objects to be pattern-recognized. Therefore, the conventional apparatus cannot be used in applications in which the vocabulary to be recognized is changed like in speech recognition, resulting in no compatibility.

SUMMARY OF THE INVENTION

It is an object of the present invention to provide a pattern recognition apparatus using a multiple similarity method, which can reduce the a number of hardware elements and has an arithmetic section with high compatibility.

In order to achieve the above object, a pattern recognition apparatus using a multiple similarity method according to the present invention, comprises:

a reception circuit (11) for receiving an input signal;

a feature data extraction circuit (12), connected to the reception circuit (11), for extracting feature data for defining an input pattern vector f in accordance with the input signal;

a feature data storage circuit (14), connected to the feature data extraction circuit (12), for storing the feature data;

a dictionary memory circuit (15) for storing standard pattern data for defining predetermined standard pattern vectors $\phi$;

a digital arithmetic circuit (16), connected to the feature data storage circuit (14) and the dictionary memory circuit (15), for performing a similarity measure calculation between the feature data and the standard pattern data in accordance with a multiple similarity method; and a control/determination circuit (13) for controlling an operation of the digital arithmetic circuit (16) and for recognizing and determining the input signal based on the calculation result from the digital arithmetic circuit (16).

And, the digital arithmetic circuit includes:

a data bus (31) for transmitting data;

a first data selection circuit (29, 32), connected to the feature data storage circuit (14) and the data bus (31), for outputting any one of the feature data, data on the data bus (31), and a predetermined constant ($\theta$);

a second data selection circuit (30, 33), connected to the feature data storage circuit (14), the dictionary memory circuit (15), and the data bus (31), for outputting any of the feature data, the standard pattern data, and data on the data bus (31);

a first register circuit (34) for storing output data from the first data selection circuit (32);

a second register circuit (35) for storing output data from the second data selection circuit (33);

a partial product generating circuit (36) for sequentially generating and outputting partial products of the storage data in the first register circuit (34) and the second register circuit (35);

a shift circuit (37) for shifting the partial products sequentially output from the partial product generating circuit (36) by a predetermined number of bits according to the multiplication algorithm and sequentially outputting the shifted products;

a digital adder (38) for sequentially performing an addition between data sequentially output from the shift circuit (37) and other data, and sequentially outputting the addition results onto the data bus (31);

a third register circuit (39) for storing the output data from the digital adder (38); and a third data selection circuit (40) for selecting one of the output data from the digital adder and the storage data in the third register circuit (39) in accordance with the arithmetic operation program and the multiplication program and supplying the selected data to the digital adder (38) as the other data, and causing the digital adder (38) to perform an accumulation operation of the partial product.

In the pattern recognition apparatus of the present invention, the multiple similarity arithmetic operation is performed as follows. First, the first data selection circuit (32) selects feature data, and stores it in the first register (34). The second data selection circuit (33) selects standard pattern data, and stores it in the second register (35). The feature data and standard pattern data are vectors, and are decomposed into a plurality of vector components (scalar amounts).

A partial product of identical vector components stored in the first and second registers is calculated by the partial product generating circuit (36). The generated partial product is shifted by a predetermined number of bits by the shift circuit (37), as needed. The output from the shift circuit (37) is supplied to one input terminal of the digital adder (38) as input data. The output data from the digital adder (38) is fed back thereto as the other input data. The digital adder (38) calculates a sum of both the data to accumulate the partial products. In this manner, an inner product of feature data (input pattern vector) and one standard pattern data (one standard pattern vector) is calculated.

The calculated inner product is stored in the first and second registers (34, 35) through the data bus (31). Accumulation of partial products is performed in the same manner as in the above inner product calculation, thus calculating a squared value of inner products. The squared value is stored in the third register.

The first data selection circuit (32) again selects feature data, and stores it in the first register (34). The second data selection circuit (33) selects different standard pattern data belonging to a category identical to the previous category, and stores it in the second register (35). Thereafter, the inner product calculation of both the data is performed in the same manner as described above, and the calculation of the squared value of the inner products is also performed. During the calculation of the squared value of the inner products, a new squared value is added to the squared value stored in the third register, and the sum is stored in the third register again. Squared values for standard pattern data in the identical category are calculated, and are added to values stored in the third register. After the calculation of the squared values for all the standard pattern data in the identical category is completed, an accumulation value of the squared values is calculated.

In this invention, since pattern recognition is performed by digital processing, the apparatus of this invention is free from adjustment. Since an identical hardware element is used for various calculations in a time-divisional manner, the number of hardware elements can be reduced. The number of standard patterns may be be freely changed, resulting in very high compatibility.

BRIEF DESCRIPTION OF THE DRAWINGS

FIG. 4 is a block diagram showing the overall arrangement when a pattern recognition apparatus using a multiple similarity method according to the present invention is applied to a speech recognition apparatus;

FIG. 5 is a view showing an arrangement of a feature extraction section of the pattern recognition apparatus shown in FIG. 4;

FIG. 6 is a view three-dimensionally showing powers of channels at respective times obtained by the feature extraction section;

FIG. 8 is a circuit diagram showing a detailed arrangement of the arithmetic section shown in FIG. 7;

DETAILED DESCRIPTION OF THE PREFERRED EMBODIMENT

Figure 1:
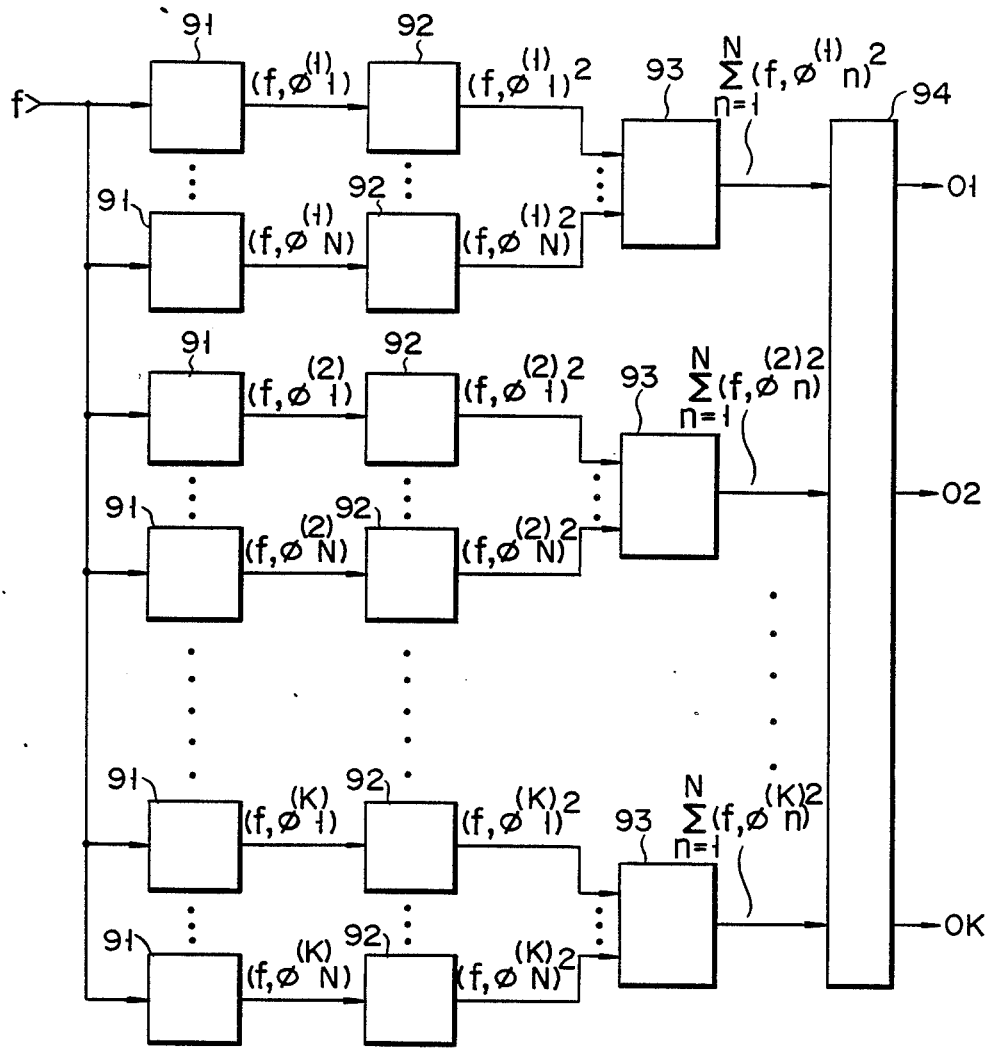
FIG. 1 is a block diagram showing an arrangement of an arithmetic section of a conventional apparatus.
Figure 2:
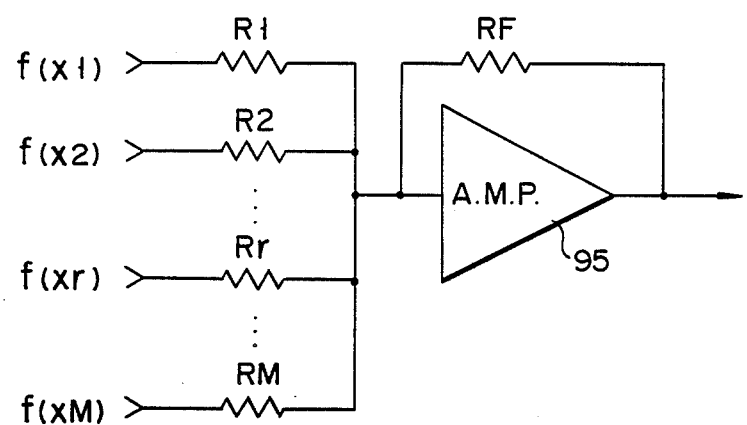
FIG. 2 is a circuit diagram of a multiplier used in the conventional apparatus.
Figure 3:
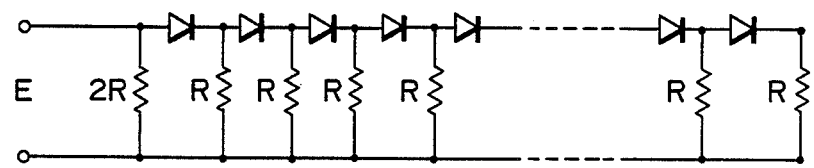
FIG. 3 is a circuit diagram of a square circuit used in the conventional apparatus.

A pattern recognition apparatus using a multiple similarity method according to the present invention will be described with reference to the accompanying drawings which are incorporated in and constitute part of this specification.

The arrangement and operation of the overall pattern recognition apparatus according to the embodiment of the present invention will be described with reference to FIG. 4. The pattern recognition apparatus shown in FIG. 4 serves as a speech recognition apparatus. In FIG. 4, a speech signal (analog signal) input through a microphone is supplied to amplifier 11 and is amplified thereby. The amplified speech signal is supplied to feature extraction section 12. Feature extraction section 12 extracts feature data constituting an input pattern vector from the input signal. Feature extraction section 12 comprises a plurality of channels of filter banks 26, analog multiplexer 24 for selecting one of outputs from filter banks 26, and analog-to-digital (A/D) converter 25, as shown in FIG. 5. Each filter bank 26 detects a power of the input signal in the corresponding frequency range, and outputs the detected power. A channel of filter banks 26 is constituted by band-pass filter (BPF) 21, full-wave rectifier (RECT) 22, and low-pass filter (LPF) 23.

The output from feature extraction section 12 is supplied to controller 13. Controller 13 comprises a ROM storing a predetermined control program and a program associated with pattern recognition based on the multiple similarity method, and a CPU which is operated in accordance with the programs stored in the ROM. Controller 13 is connected to RAM 14, dictionary memory 15, and arithmetic section 16 through bus 17. Controller 13 causes RAM 14 to store the feature data.

Dictionary memory 15 stores standard pattern data constituting standard pattern vectors for K words in the vocabulary (K is the number of categories). N standard patterns are prepared for each word in the vocabulary (N is the number of standard pattern vectors for each category).

Arithmetic section 16 accesses RAM 14 and dictionary memory 15 under the control of controller 13 and receives feature data and standard pattern data. Arithmetic section 16 performs similarity measure calculation based on the multiple similarity method using the received data. Arithmetic section 16 sends the calculated results to controller 13 through bus 17.

Controller 13 performs determinations such as maximum value detection using the calculated results from arithmetic section 16. Controller 13 is responsive to the determination result to output a recognition result such as "recognize", "reject", or "conflict".

Feature extraction section 12 may be arranged such that after the output from amplifier 11 is A/D converted, the digital data is frequency-analyzed by a digital filter.

FIG. 6 three-dimensionally shows powers of an input signal in respective channels at respective times obtained from feature extraction section 12. In FIG. 6, channels are set in correspondence with frequencies. The number of channels is S. P sampling points are plotted along the time axis. In FIG. 6, when number P of sampling points and number S of channels are infinitely increased, a curved plane is defined in the three-dimensional space. This curved plane corresponds to a feature pattern (i.e., input pattern f(x)). In practice, number S of channels and number P of sampling points are finite numbers. For this reason, curved plane f(x) is rendered discrete by power values at S×P lattice points of channels along the frequency axis and sampling points along the time axis. Discrete curved plane f(x) is vector f in equation (1): where: f={f(xr)}

$$\sum_{r=1}^{M}$$

[f(x1), f(x2), ... ,f(xM)]$^T$(M=S×P)

Each standard pattern vector $\phi^{(k)}$n stored in dictionary memory 15 is also formed using many {f(xr)}

$$\sum_{r=1}^{M}$$

$\phi^{(k)}$n =[$\phi^{(k)}$n(x1), $\phi^{(k)}$(x2), ... , $\phi^{(k)}$n(xM)]$^T$ Multiple similarity is defined by equation (4):

$$S^{(k)}(f) = \sqrt{\sum_{n=1}^{N}\left(\sum_{i=1}^{M} fi \times \phi^{(k)}ni\right)^2} \Big/ \sqrt{\sum_{i=1}^{M} fi^2} \quad (4)$$

(where $fi = f(xi)$, $\phi^{(k)}ni = \phi^{(k)}n(xi)$)

Arithmetic section 16 performs arithmetic operations of equations (5) and (6):

$$①\ S^{(k)}(f) = \sum_{n=1}^{N}\left(\sum_{i=1}^{M} fi \times \phi^{(k)}ni\right)^2 \quad (5)$$

$$②\ \theta\|f\|^2 = \theta \sum_{i=1}^{M} fi^2 \quad (6)$$

(where $\theta$ is a constant)

Figure 7:
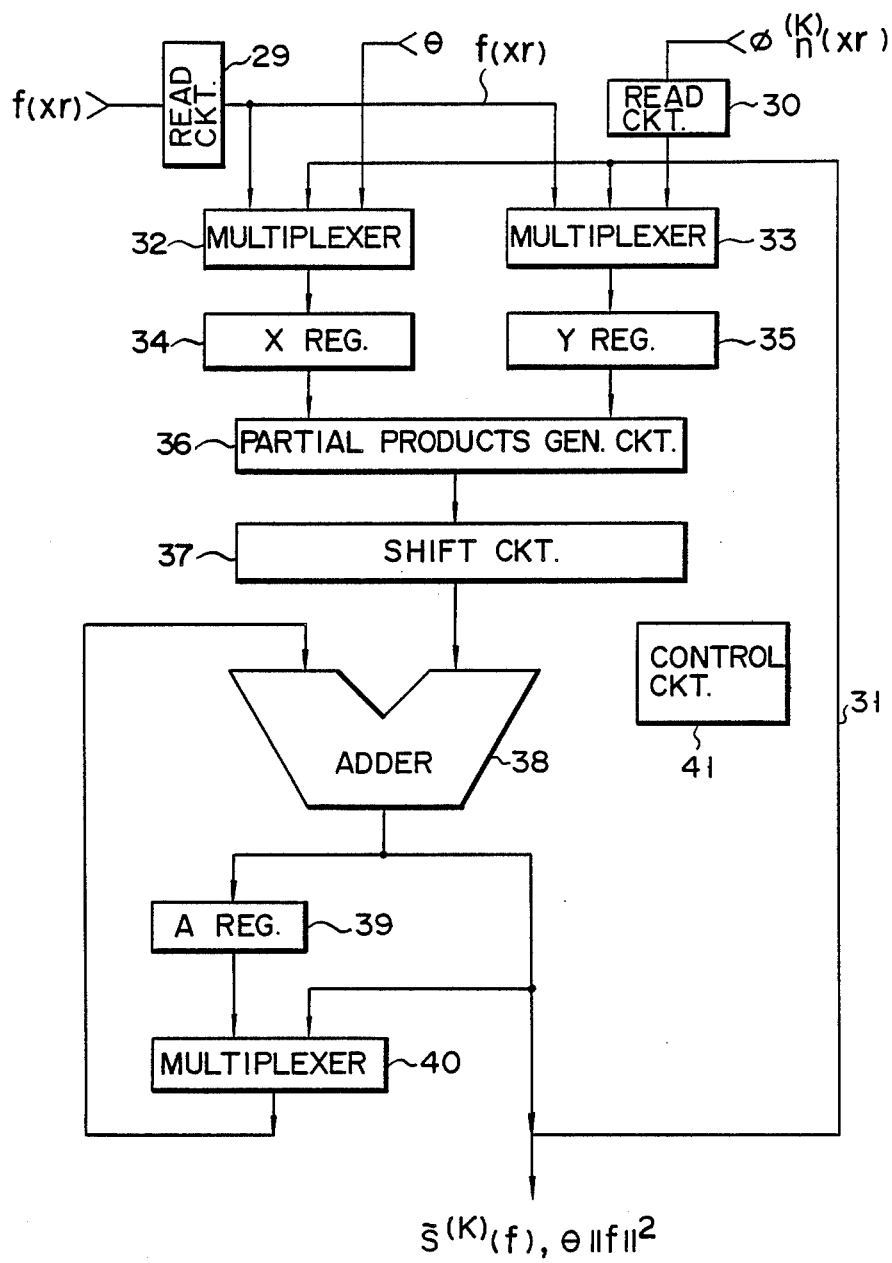
FIG. 7 is a block diagram showing an arrangement of an arithmetic section of the pattern recognition apparatus shown in FIG. 4.

A detailed arrangement of arithmetic section 16 will be described with reference to FIG. 7. In FIG. 7, arithmetic section 16 is arranged as follows.

Read circuit 29 reads out feature data stored in RAM 14. Read circuit 30 reads out standard pattern data stored in dictionary memory 15. Output data f(xr) from read circuit 29, data on data bus 31, and constant data $\theta$ are supplied to multiplexer 32 which selects one of input data. Output data f(xr) from read circuit 29, output data $\phi^{(k)}(xr)$ from read circuit 30, and data on data bus 31 are supplied to multiplexer 33 which selects one of input data. The output data from multiplexer 32 is stored in X register 34. The output data from multiplexer 33 is stored in Y register 35. Storage data of X and Y registers 34 and 35 are supplied to partial product generating circuit 36. Partial product generating circuit 36 generates a partial product in accordance with a predetermined multiplication algorithm. The partial product generated by circuit 36 is supplied to shift circuit 37. The supplied partial product is shifted by shift circuit 37 in accordance with the multiplication algorithm. For example, if the multiplication algorithm of this circuit corresponds to an adder array method, the partial product is shifted by (i−1) bits (i indicates an ith partial product). If the multiplication algorithm corresponds to a Booth's algorithm, the partial product is shifted by 2(i−1) bits. The output data from shift circuit 37 and the output data from multiplexer 40 (to be described later) are added to each other by digital adder 38. The output data from digital adder 38 is stored in A register 39. One of the output data from A register 39 and adder 38 is selected by multiplexer 40, and is supplied to digital adder 38. The output from digital adder 38 is also output onto data bus 31. Timing generator 41 supplies signals indicating operation timings to respective sections.

The operation of the circuit shown in FIG. 7 will be described below.

Input pattern vector f and standard pattern vector $\phi^{(k)}n$ cannot be directly calculated by a digital arithmetic circuit. For this reason, these vectors are decomposed in advance into M vector components (scolar amounts). Then, identical vector components are subjected to an arithmetic operation.

This circuit first performs a calculation for obtaining a product of a first component f1 of input pattern vector f and a first component $\phi^{(1)}11$ of a first standard pattern vector belonging to a first category.

Multiplexer 32 selects a first component f(x1) of input pattern vector f. Multiplexer 33 selects first component $\phi^{(1)}11$ of first standard pattern vector of the first category. Selected components are respectively stored in X and Y registers 34 and 35.

Partial product generating circuit 36 generates a first partial product of the first components of the input pattern vector and the standard pattern vector. The generated partial product is supplied to partial product shift circuit 37. The first partial product is supplied to adder 38 without being shifted by shift circuit 37. In an initial state, output data from adder 38 is "0", and data "0" is supplied to the other input terminal of adder 38 through multiplexer 40. Therefore, adder 38 adds the first partial product to data "0". The sum is fed back to adder 38 through multiplexer 40.

When the addition is performed in adder 38, partial product generating circuit 36 generates a second partial product. The second partial product is shifted by the number of bits according to the multiplication algorithm, and is input to adder 38. Adder 38 adds the data input through multiplexer 40 to the shifted second partial product. The sum is again supplied to adder 38 through multiplexer 40.

The accumulation of the partial products is performed a required number of times, so that product $f1 \times \phi^{(1)}11$ of first components is calculated. Then, vector components f2 and $\phi^{(1)}12$ are respectively set in the X and Y registers. The same operation as described above is repeated to obtain partial products, and the partial products are accumulated. After the arithmetic operation of $fM \times \phi^{(k)}1M$ is completed, an inner product $$(= \sum_{i=1}^{M}$$

$fi \times \phi^{(1)}1i$) between the input pattern and one standard pattern is calculated. The inner product is output onto data bus 31.

Then, multiplexers 32 and 33 select the inner product on data bus 31. The inner product is stored in X and Y registers 34 and 35. Thereafter, a product of inner products is calculated by the same operation as described above. With the above operation, a squared value {=

$$(\sum_{i=1}^{M}$$

$fi \times \phi^{(1)}1i)^2\}$ of the inner product of input pattern vector f and first standard pattern vector $\phi^{(1)}1$ of the first category is calculated. The squared value is stored in A register 39.

An inner product between the input pattern vector f and a second standard pattern vector $\phi^{(1)}2$ in the first category is calculated by the same operation as described above. Furthermore, a square of the inner product is calculated. Data held in A register is supplied to the other input terminal of adder 38, and is added to the first partial product. Thereafter, the output from adder 38 is fed back to the other input terminal of adder 38 and is accumulated with the partial product. Thus, during a process for calculating a squared of the inner product, a square value held in A register 39 and a new calculated squared value are added by adder 38. The sum is again stored in A register 39. In other words, the accumulation result of the squared of the inner product is stored in A register 39. The accumulation value of the squared values for N standard patterns in an identical category is sent, as $\tilde{S}^{(k)}(f)$ given by equation (5), to controller 13 through data bus 31 and bus 17. Subsequently, the same arithmetic operations are repeated for other categories.

The arithmetic operation of $\theta \| f \|^2 = \theta$ $$\theta \sum_{i=1}^{M}$$

$fi^2$ in equation (6) is performed as follows. A product of identical vector components of vector f is calculated in the same manner as described above. The calculated product is accumulated to obtain an inner product of vector f and vector f. The result is stored in Y register 35. X register 34 stores constant data $\theta$. A product of the inner product and $\theta$ is then calculated. Result $\theta \| f \|^2$ is also sent to controller 13 through data bus 31.

If the value of $\theta \| f \|^2$ exceeds a predetermined value, controller 13 performs determinations such as maximum value detection using the value of $\tilde{S}^{(k)}(f)$. If the value of $\theta \| f \|^2$ is smaller than the predetermined value, controller 13 does not perform determination, and outputs data indicating "reject" or "conflict".

In this embodiment, an inner product calculation, a calculation of the squared value of the inner product, accumulation of the squared value of the inner product, $\| f \|^2$ of the input pattern and the like are performed using hardware shown in FIG. 7. Therefore, a similarity measure calculation can be performed using a small number of hardware elements. In addition, the arithmetic operations are performed while using the hardware shown in FIG. 7 in a pipeline manner, and similarity measure calculation can be performed at high speed.

Since arithmetic section 16 can comprise a digital circuit, it is free from adjustment, and is suitable for an integrated circuit.

A detailed arrangement of the multiplication circuit shown in FIG. 7 will be described in more detail with reference to FIG. 8. In the circuit shown in FIG. 8, a secondary Booth's algorithm is used as the multiplication algorithm and two adders are used, so as to allow a pipeline calculation.

In this case, each component of input pattern vector f and standard pattern vector $\phi^{(k)}n$ is constituted by 16-bit data.

Figure 13:
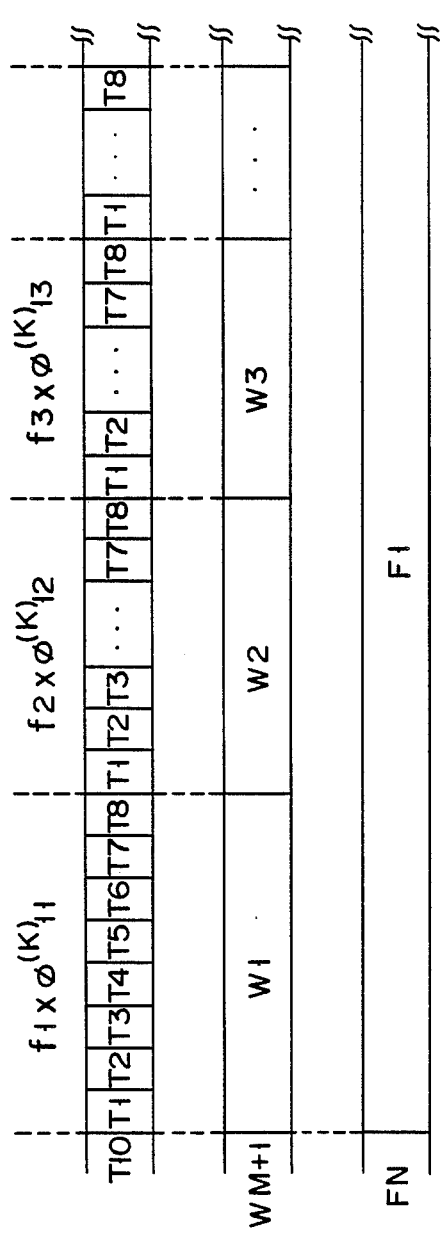
FIG. 13 is a view showing the relationship among clocks.
Figure 13:
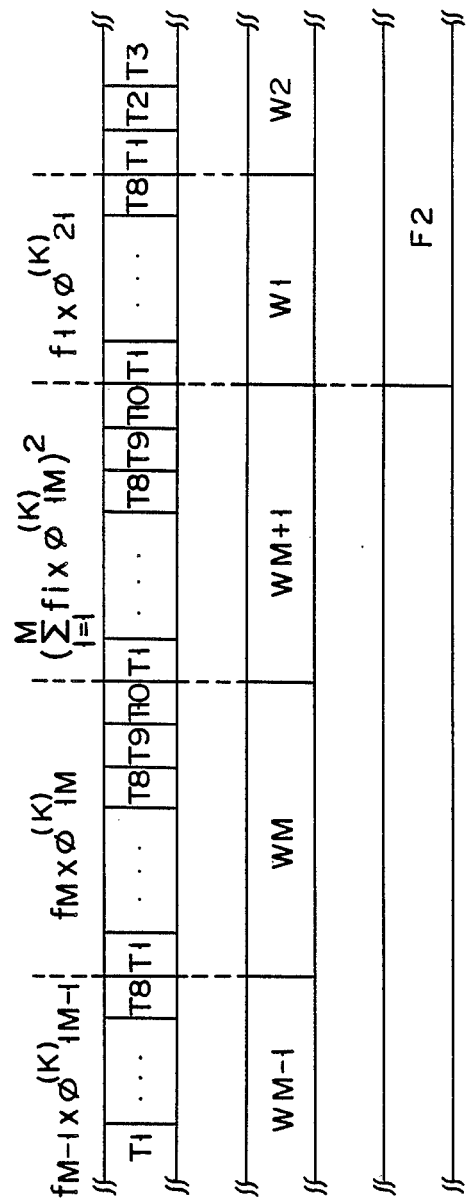

Prior to the description of the arrangement of the arithmetic section, fundamental clock signals will be explained with reference to FIG. 12. The arithmetic section uses fundamental clock signals $\phi 1$ and $\phi 2$ of two phases. Fundamental clock signal $\phi 2$ has the same period as clock signal $\phi 1$, and is shifted therefrom by half a bit. Clock signals $\{Ti\}(i=1 \text{ to } 10)$ are formed based on fundamental clock signals $\phi 1$ and $\phi 2$. The pulse width of clock signals T1 to T10 is equal to the period of clock signal $\phi 2$, and these signals are synchronous with signal $\phi 2$. The periods of clock signals T1 to T8 can be varied, e.g., in a duration, one period consists of 8 clocks and in another duration, one period consists of 10 clocks. A period of each of clock signals T9 and T10 consists of 10 clocks. FIG. 13 shows this state. As shown in FIG. 13, 8 clocks of signal Ti constitute one period until an arithmetic operation of $fM-1 \times \phi^{(k)}nM-1$, and clocks T1 to T8 are output. During an arithmetic operation of $fM \times \phi^{(k)}nM$ and a calculation of the squared value of the inner product, one period of clock signal Ti consists of 10 pulses, and clocks T1 to T10 are output.

Figures 11, 12:
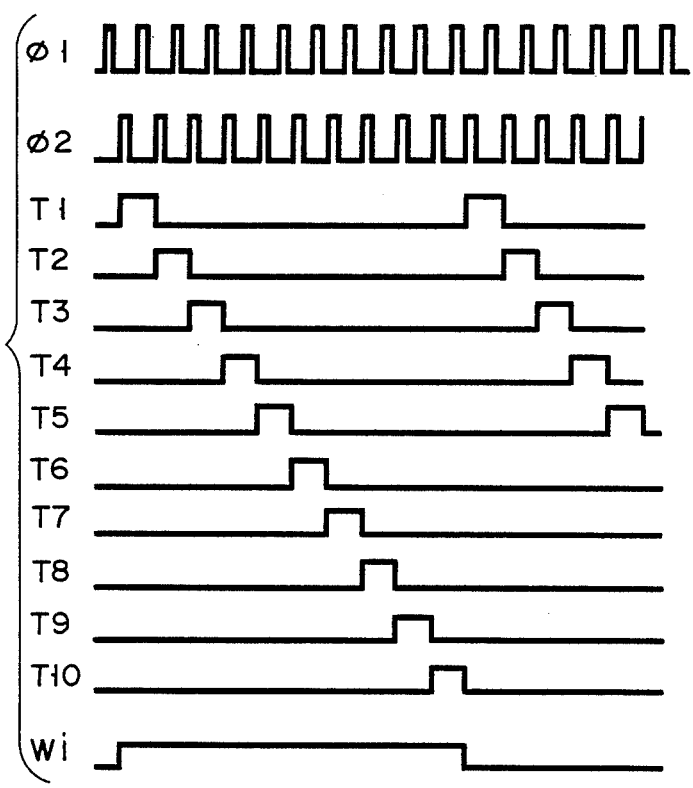
FIG. 11 is a table showing the relationship between I/O data of the Y decoder and that of the partial product generating circuit.
FIG. 12 is a view showing a fundamental clock signal used in the arithmetic section shown in FIG. 8.

W1 to WM+1 in FIGS. 12 and 13 are pulse signals having the same pulse width as the period of signal Ti and synchronous with signals $\phi 2$ and T1. As shown in FIG. 13, pulse signals W 1 to WM-1 are output when one period of signal Ti consists of 8 clocks, while signals WM and WM+1 are output when one period of signal Ti consists of 10 clocks. $\{FI\}(I=1 \text{ to } N)$ in FIG. 13 are pulse signals having the pulse width corresponding to signals W1 to WM+1 and synchronous with signals $\phi 2$, T1, and W1.

The arrangement of the circuit shown in FIG. 8 will be described below.

Data bus 51 has a 16-bit configuration, and corresponds to data bus 31 shown in FIG. 7. Read circuits 49 and 50 corresponding to read circuits 29 and 30 shown in FIG. 7 are arranged. Multiplexer 52 selects and outputs any of output data f(xr) from read circuit 49, data on data bus 51, and constant data $\theta$ in response to control signal C1, and corresponds to multiplexer 32. Multiplexer 53 selects and outputs any of output data f(xr) from read circuit 49, output data $\phi^{(k)}n(xr)$ $(=\phi^{(k)}nr)$ from read circuit 50, and data on data bus 51 in response to control signal C2, and corresponds to multiplexer 33. X register 54 corresponds to register 34, and latches output data from multiplexer 52 in synchronism with pulse XL $(=T1\cdot\phi 1)$. Y register 55 corresponds to register 35, and latches output data from multiplexer 53 in synchronism with pulse YL $(=T1\cdot\phi 1)$.

The output data from X register 54 is supplied to latch 61 which is operated in synchronism with clock signal $\phi 2$. Output AX from latch 61 is supplied to partial product generating circuit 56 corresponding to partial product generating circuit 36.

The output data from Y register 55 is supplied to multiplexer 62 which is controlled by clock signal $\{Ti'\}$ $(i=1 \text{ to } 8)$. Clock signal $Ti'$ is obtained by shifting clock signal Ti by half a bit of clock signal $\phi 2$ (delaying it by half a period). Multiplexer 62 selects and outputs adjacent three bits of data held in Y register 55. The output data from multiplexer 62 is input to Y decoder 63 which decodes an input signal in accordance with the secondary Booth's algorithm.

The 3-bit data from Y decoder 62 is supplied to latch 64 which is operated in synchronism with clock signal $\phi 2$. Output AY from latch 64 is input to partial product generating circuit 56.

Partial product generating circuit 56 generates 17-bit partial product $\{(PP)i\}$ from data AX and AY. Multiplier Y has 16 bits, and this circuit employs the Booth's algorithm. Therefore, 8 partial products (PP)i are finally generated. These 8 partial products are represented as $\{(PP)i\}(i=1 \text{ to } 8)$. 17-bit partial product (PP)i generated by generating circuit 56 and carry signal CA and from latch 64 are input to shifter 57 control signal LOOPO. Shifter 57 corresponds to partial product shift circuit 37. Shifter 57 shifts input partial product (PP)i in accordance with the secondary Booth's algorithm to convert the partial product into the form of $(PP)i \times 2^{i-1}$, and adds code extension bits thereto. Shifter 57 also converts data CA into the form of $CA \times 2^{i-1}$.

Lower 18 bits FixL and carry C of the output data from shifter 57 are supplied to latch 65 which is operated in synchronism with clock signal $\phi 1$. The output from latch 65 is supplied to terminal EL of full adder (FAL) 58A. Terminal GL of FAL 58A receives the output from latch 66 which is operated in synchronism with clock signal $\phi 1$. The output from FAL 58A is supplied to latch 67 which is operated in synchronism with clock signal $\phi 2$, and to latch 59A which is operated in synchronism with clock signal $\phi$LL. Latch 67 receives control signal ZEROL as a reset signal. The outputs from latches 67 and 59A are supplied to latch 66 as data BL through switches SW1 and SW2. The carry data from latches 59A and 67 are supplied to latch 72 which is operated in synchronism with clock signal $\phi$1.

Upper 18 bits FixH of the output data from shifter 57 are supplied to latch 68 which is operated in synchronism with clock signal $\phi$1. The output from latch 68 is supplied to latch 69 which is operated in synchronism with clock signal $\phi$2. The output from latch 69 is supplied to latch 70 which is operated in synchronism with clock signal $\phi$1. The output from latch 70 is supplied to terminal EH of 18-bit full adder (FAH) 58B. Terminal GH of FAH 58B receives the output from latch 71 which is operated in synchronism with clock signal $\phi$1. A carry input terminal of FAH 58B receives the output from latch 72. The output data from FAH 58B is supplied to latch 73 which is operated in synchronism with clock signal $\phi$2 and to latch 59B which is operated in synchronism with clock signal $\phi$LH. Latch 73 receives control signal ZEROH as a reset signal. The outputs from latches 73 and 59B are supplied to latch 71 as data BH through switches SW3 and SW4. The output from latch 73 is output onto data bus 51 through switch SW5. Switches SW1 to SW5 receive control signals CSW1 to CSW5. The above clock signals, timing pulses, and control signals are supplied from timing control circuit 74 (may be supplied from controller 16).

Latches 59A and 59B correspond to A register 39 shown in FIG. 7, and switches SW1 to SW4 correspond to multiplexer 40. Adders 58A and 58B correspond to adder 38. Adder 58A serves to calculate lower bits of adder 38, and adder 58B serves to calculate upper bits of adder 38.

FIG. 8 shows a circuit of addition outputs from adders 58A and 58B, where only the output from upper adder 58A is output onto bus 51. The output from lower adder 58B is not output onto bus 51. Since the weight of the output from lower adder 58A is very small with respect to the addition result as a whole, the output from the lower adder is rounded.

Figure 9:
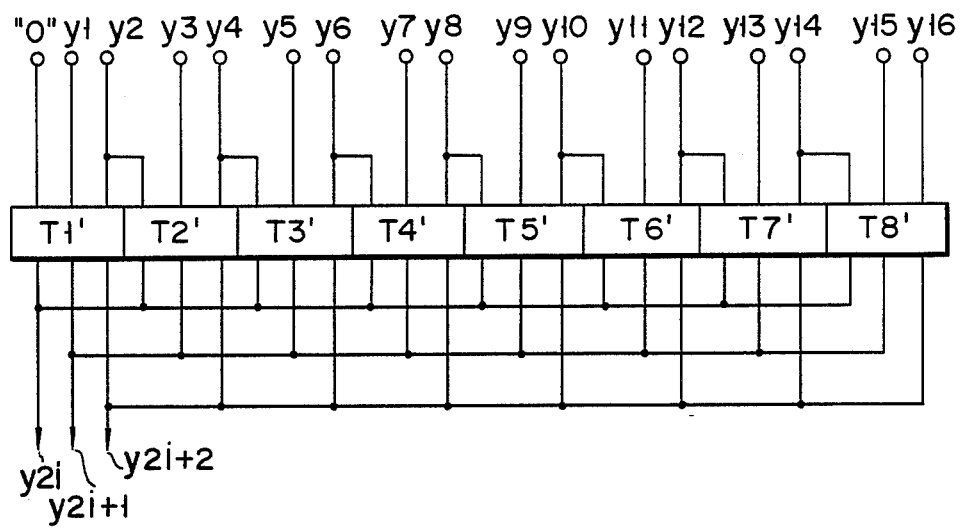
FIG. 9 is a view showing an arrangement of a multiplexer shown in FIG. 8.

FIG. 9 shows a detailed arrangement of multiplexer 62 shown in FIG. 8. Multiplexer 62 selects and outputs adjacent three bits (y2i, y2i+1, y2i+2; i=0, 1, 2, ..., 7) of the 16-bit output (y0, y1, ..., y16) from Y register 55 in response to pulse signal Ti (i=1 to 8).

Figure 10:
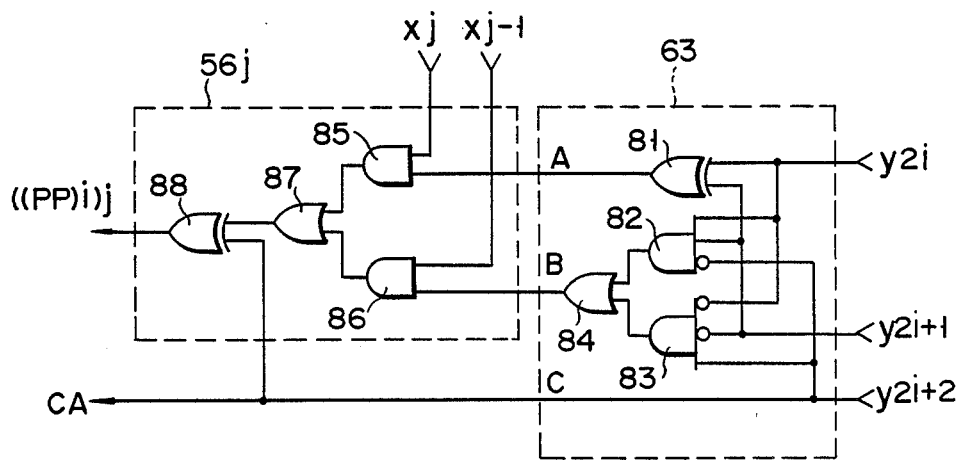
FIG. 10 is a view partially showing an arrangement of a Y decoder and a partial product generating circuit in FIG. 8.

FIG. 10 shows the arrangement of Y decoder 63, and jth arrangement 56j of partial product generating circuit 56. Y decoder 53 comprises EX-OR gate 81, two AND gates 82 and 83, and OR gate 84. Y decoder 63 outputs signals A, B, and C based on 3-bit data y2i, y2i+1, and y2i+2.

Partial product generating circuit 56j comprises two AND gates 85 and 86 and EX-OR gate 88. Generating circuit 56j receives bit data xj-1 and xj of 16-bit data latched by latch 61, and outputs jth-bit data (PPi)j of the partial product and carry CA. Note that x0="0", and x17 (code extension bit)=x16. Generating circuit 56 outputs 17-bit data.

FIG. 11 shows the relationship between I/O data of Y decoder 63 and the output data from partial product generating circuit 56. In the circuit shown in FIG. 10, when partial product (PP)i is −X or −2X and y2i=y2i+1=y2i+2="0", partial product (PP)i is output in the form of a complementary number of 1. For this reason, in order to recover the output partial product to an original value, "1" must be added to the LSB of partial product (PP)i to be converted into the form of a complementary number of 2. For this purpose, in this embodiment, (PP)i and CA are added to each other by FAL 58A in an addition operation (to be described later).

Figure 14:
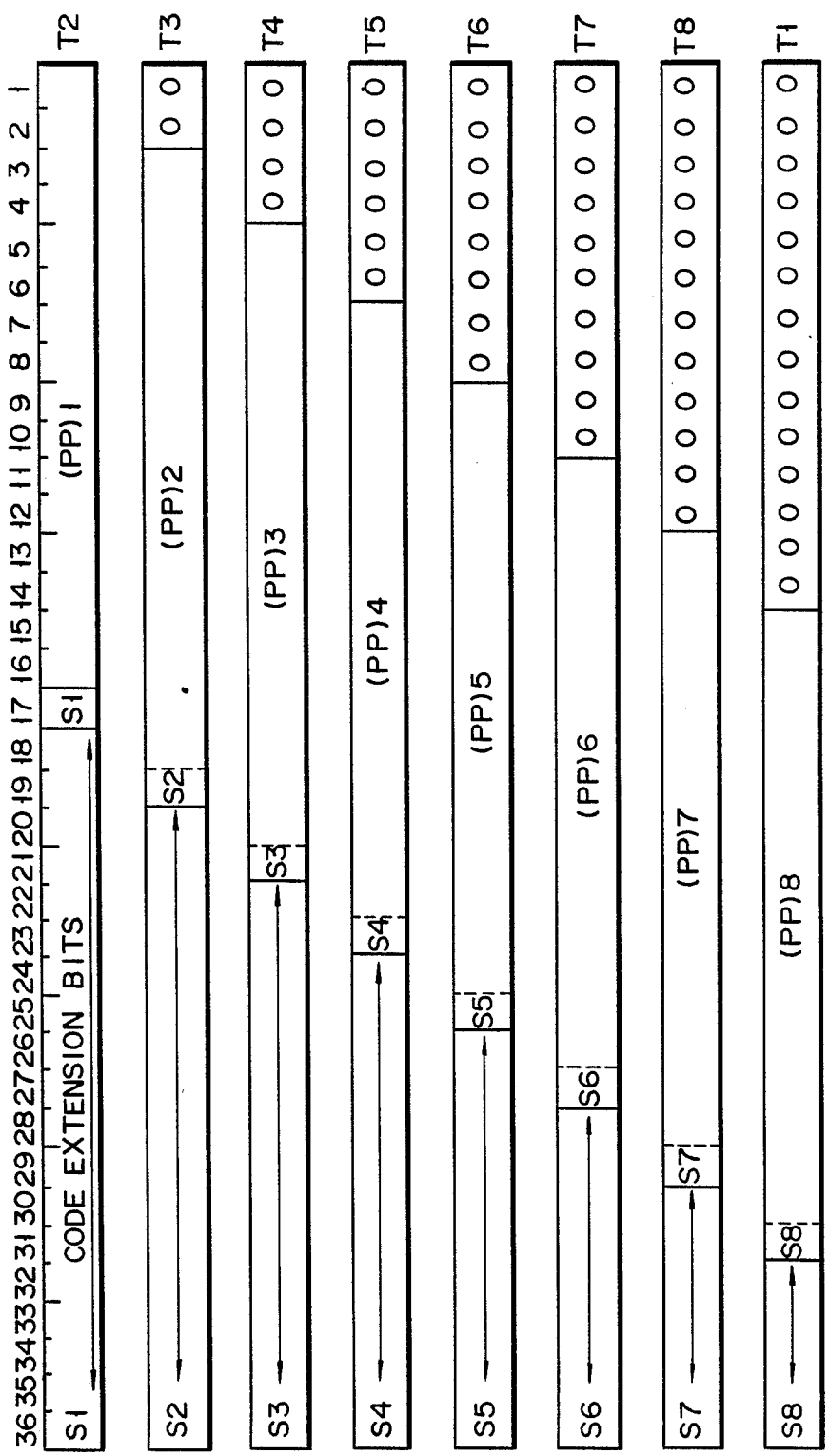
FIG. 14 is a view showing output data from a shifter shown in FIG. 8.

Shifter 57 shifts input partial product (PP)i by 2(i−1) bits in accordance with the secondary Booth's algorithm. FIG. 14 shows the output signal from shifter 57. In FIG. 14, the output data from shifter 57 is assumed to have 36 bits. Shifter 57 also shifts carry CA by 2(i−1) bits. T1 to T8 shown on the right side in FIG. 14 mean that modified partial product (PP)i and CA shown on the left side are output at timings defined by these pulse signals. Control signal LOOPO input to shifter 57 forcibly sets the output from shifter 57 to be "0".

Figure 15:
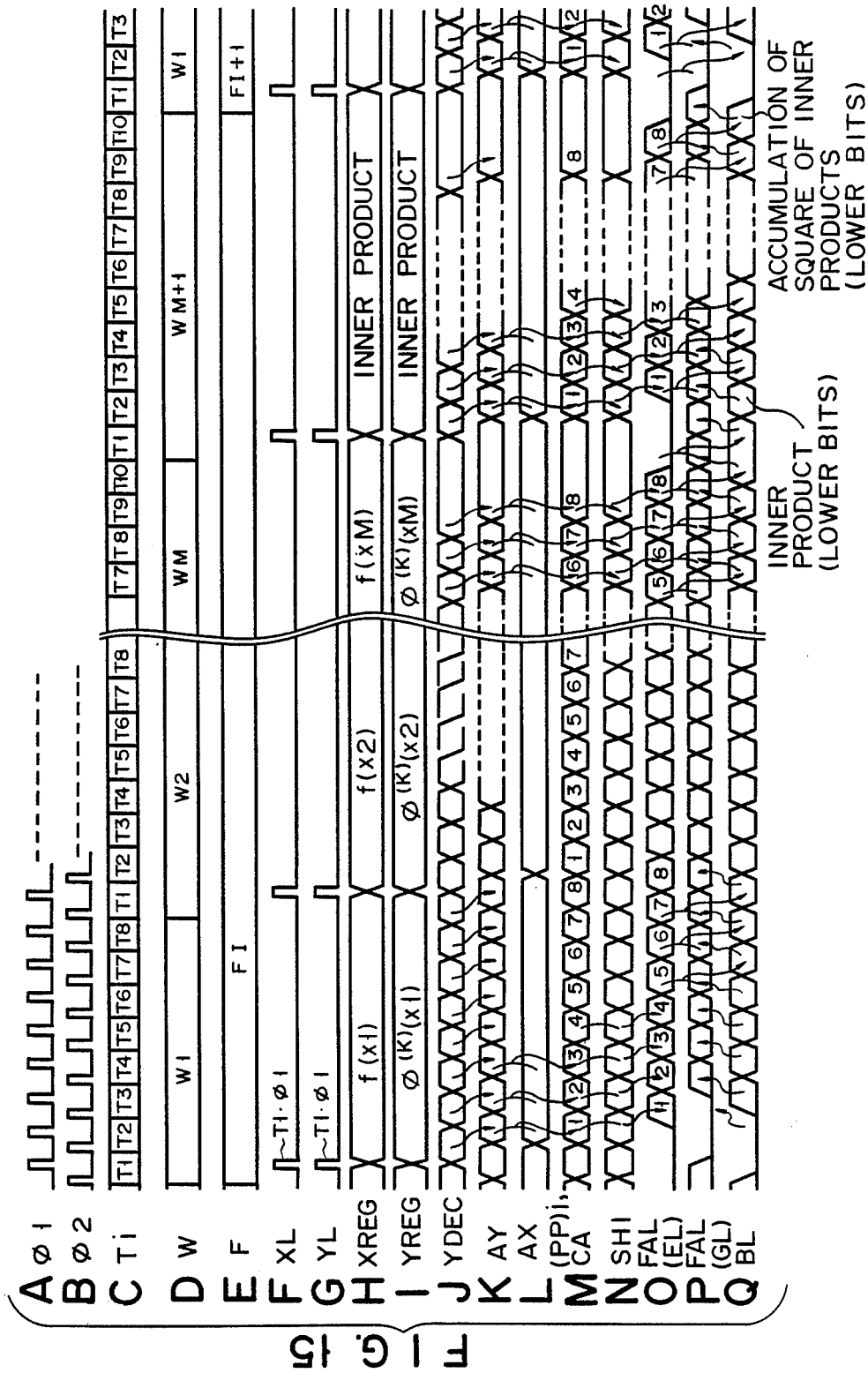
FIGS. 15 and 15 cont. are timing charts for explaining the operation of the arithmetic section shown in FIG. 8.

The operation for performing arithmetic operations of equations (5) and (6) by the arrangement shown in FIG. 8 will be described with reference to the timing charts shown in FIGS. 15A to 15Z and FIGS. 15a to 15f. FIGS. 15A to 15Z mainly show the first and second halves of pulse FI. Pulse FI has a duration for which $\Sigma(f_i \times \phi^{(k)}I)$ in the case of n=I is calculated. FIGS. 15A to 15F define the same timings as those shown in FIG. 13.

Read circuits 49 and 50 read out first component f1{=f(x1)} of input pattern vector f from RAM 14, and read out first component $\phi^{(k)}$I1{=$\phi^{(k)}$I(x1)} of standard pattern vector $\phi^{(k)}$I(x1) of kth category from dictionary memory 15. In response to control signal C1, multiplexer 52 selects component f1 of input pattern vector f. In response to control signal C2, multiplexer 54 selects first component $\phi^{(k)}$I1 of standard pattern vector $\phi^{(k)}$I. The selected components are supplied to X and Y registers 54 and 55, respectively. X and Y registers 54 and 55 latch input data in synchronism with pulses XL and YL shown in FIGS. 15F and 15G, and output the latched data at timings shown in FIGS. 15H and 15I.

Multiplexer 62 selects and outputs predetermined three bits (y0, y1, y2) from output data of Y register 55 in synchronism with pulse signal T1'. Y decoder 63 decodes the 3-bit data in accordance with the relationship shown in FIG. 11, and outputs the decoded result at a timing shown in FIG. 15J. Latch 64 latches the output (YDEC) from decoder 63 in synchronism with clock signal $\phi$2, and outputs it at a timing shown in FIG. 15K.

Latch 61 latches output data from X register 54 in synchronism with clock signal $\phi$2, and outputs it as data AX at a timing shown in FIG. 15L.

Data AX and AY are supplied to partial product generating circuit 56. Generating circuit 56 generates 17-bit partial product (PP)1. Partial product (PP)1 is output at a timing shown in FIG. 15M.

Generated partial product (PP)1 and carry CA from latch 64 are supplied to shifter 57. Shifter 57 shifts partial product (PP1) and carry CA by 2(i−1) bits, respectively, and adds a code bit thereto. Shifter 57 outputs 36-bit data and carry C at a timing shown in FIG. 15N.

Lower 18 bits FixL of 36-bit data and carry CA from shifter 57 are supplied to latch 65. At that time, as shown in FIGS. 15R and 15S, signals ZEROL and CSW1 are active, and hence, latch 67 is reset and switch SW1 is ON. Latch 66 receives data "0" through switch SW1. As shown in FIGS. 15O and 15P, latches 65 and 66 latch input data in synchronism with clock signal $\phi$1, and supply the data to adder 58A. Adder 58A adds the supplied data. When the addition result is output, signal ZEROL goes to nonactive level, as shown in FIG. 15R, and latch 67 latches the output from adder 58A in synchronism with clock signal $\phi 2$. As shown in FIG. 15S, signal CSW1 is kept at active level, and the output data from latch 67 is supplied to latch 66 as data BL at a timing shown in FIG. 15Q. Carry data generated during addition in adder 58A is supplied to latch 72 to adjust timings.

Upper 18 bits of output data from shifter 57 are added to data from latch 71 by adder 58B. In order to adjust a timing at which carry data CR is supplied to adder 58B to a timing at which upper 18-bit data FixH is supplied, upper bits FixH are delayed by latches 68 and 69. As shown in FIGS. 15X and 15Y, signals CSW3 and ZEROH are at active level, and latch 71 receives data "0" from latch 73 selected by switch SW3. As shown in FIGS. 15T to 15V, carry data CR, upper 18-bit data FixH, and data BH are supplied to adder 58B in synchronism with clock signal $\phi 1$. Adder 58B adds the supplied data FixH from shifter 57, carry CR from lower adder 58A, and latch data "0" from latch 71. When the addition result is output, control signal ZEROH goes to nonactive level, as shown in FIG. 15Y, and the addition result from adder 58b is supplied to latch 71 through latch 73.

After an interval corresponding to half a clock has passed from when data is latched by latches 61 and 64, data is input to lower adder 58A. After an interval corresponding to one clock has passed, a lower-bit addition is completed. After an interval corresponding to 1.5 clocks, data is supplied to upper adder 58B. After an interval corresponding to 2 clocks has passed, upper-bit addition is completed.

When the lower-bit addition result of first partial product (PP)1 is supplied, as input data BL, to latch 66 in synchronism with clock signal $\phi 2$, latches 61 and 64 latch the next data, next partial product (PP)2 is output from partial product generating circuit 56, and next 36-bit data is output from shifter 57. In synchronism with next clock signal $\phi 1$, lower bits of the first addition result are supplied to full adder 58A as a GL input, and lower bits of 2-bits shifted data of next partial product (PP)2 are supplied to full adder 58A as an EL input. Full adder 58A adds the first addition result to the lower bits of partial product (PP)2. Since 8 partial products are present for one vector component, lower bits of the multiplication result of first vector components are obtained in synchronism with next clock signal $\phi 2$ after the above addition loop is executed 8 times. After a time corresponding to one clock is delayed, upper bits of the multiplication result of the first vector components by upper adder 58B are obtained.

After a time corresponding to 8 clocks has passed and a period of FI W2 begins, read circuits 49 and 50 read out second component $f(x2)(=f2)$ of input pattern f and second component $\phi^{(k)}I(x2)(=\phi^{(k)}I2)$ of standard pattern $\phi^{(k)}I$, and supply them to multiplexers 52 and 53, respectively. Multiplexer 52 selects second component f2 of input pattern f. Multiplexer 53 selects second component $\phi^{(k)}I2$ of standard pattern $\phi^{(k)}I$. The selected data is supplied to X and Y registers 54 and 55, respectively. Thereafter, the same operation as in period W1 is repeated, and generation and accumulation of partial products of the second components are performed. The upper bits of the accumulation value are stored in latch 71, and the lower bits thereof are stored in latch 66.

In this manner, in the circuit shown in FIG. 8, partial products can be continuously input to shifter 57 so as to perform accumulation of these partial products. A period for which data in X and Y registers 54 and 55 are to be updated corresponds to 8 clocks. Therefore, a period of each of W1 to WM is constituted by pulses T1 to T8, and data in X and Y registers 54 and 55 are updated at a timing of T1 $\phi 1$ in each period, so that a calculation {of $$\sum_{i=1}^{M}$$

$f(xi) \times \phi^{(k)}I(xi)$} is executed.

In order to calculate a square of the inner product, after the calculation of the inner product is completed, the inner product is stored in the X and Y registers, and the similar calculation as above can be performed. 10 clocks are required to complete a multiplication calculation of upper bits of final vector components. For this reason, period WM consists of 10 clocks.

When upper adder 58B outputs the final addition value, signal SCW5 shown in FIG. 15Z is output, switch SW5 is turned on, and the final product is output onto bus 51, as shown in FIG. 15a. Timing controller 74 outputs signals XL and YL shown in FIGS. 15F and 15G, and the inner product is held in X and Y registers 54 and 55. Thereafter, partial products are sequentially generated in the same manner as described above, and the generated partial products are shifted. Meanwhile, signals CSW2 and CSW4 are output at timings shown in FIGS. 15b and 15c, and data (accumulation value of square values of the previously obtained inner products) held in latches 59A and 59B are supplied to latches 66 and 71 as data BL and BH, respectively. Thereafter, the accumulation value of the squared values and the partial products are accumulated to obtain the accumulation value of the squared values of the inner products. Lower bits of the accumulation value of the squared values of the inner products are stored in latch 59A in synchronism with signal $\phi LL$ shown in FIG. 15e, and upper bits thereof are stored in latch 59B in synchronism with signal $\phi LH$ shown in FIG. 15f.

The read circuits 49 and 59 read out components of the next (I+2)th standard pattern vector $\phi^{(k)}(I+1)$ and components of the input pattern vector f to calculate inner products of the (I+1)th standard pattern vector and the input pattern vector. The accumulation value of the squared values of the inner product are calculated, and lower bits of the accumulation value are stored in latch 59A and upper bits thereof are stored in latch 59B. The above operation is repeated. When a calculation in the case of n=N is completed, calculations associated with the category of interest is completed. The final accumulation value of the square values is output onto data bus 51 through switch SW5 and is then supplied to controller 13 (FIG. 1) via a bus interface (not shown).

A calculation of $\theta \times ||f||^2$ is performed such that after inner product (f, f) is calculated in the same manner as described above, partial products of the resultant inner product and constant $\theta$ are calculated.

The timing charts shown in FIGS. 12 and 13 only illustrate a procedure for calculating $$[\sum_{i=1}^{M}$$

$f(xi) \times \phi^{(k)}I(xi)\}]^2$. However, other calculations are similarly performed.

In the apparatus according to this embodiment, value N (i.e., the number of pulses F) can be changed to cope with a change in number of standard patterns. Value M can be changed to cope with a change in number of dimensions (number of channels×number of sampling points) of the input pattern vector. Therefore, the apparatus of this embodiment has very high compatibility.

In the above embodiment, a pattern to be recognized is a speech signal. However, the present invention may be similarly applied to an apparatus for recognizing a graphic pattern.

Since recognition is performed by digital processing, the apparatus of the above embodiment is free from adjustment. Since an identical hardware element is used for various calculations in a time-divisional manner, the number of hardware elements can be reduced. The number of standard patterns may be changed by increasing/decreasing value N, and hence, may be freely changed, resulting in very high compatibility.

When the arithmetic section shown in FIG. 7 or 8 is used, the entire circuit is operated based on pipeline processing, and high-speed processing is allowed. Since the partial product is obtained using the secondary Booth's algorithm, processing at higher speed may be expected. Since two adders are arranged in a pipeline manner, this also allows high-speed processing. Note that if an addition of a selector output can be performed within a period of one clock, a pipeline arrangement need not be adopted.

What is claimed is:

1. A pattern recognition apparatus comprising:
   reception means for receiving an input signal;
   feature data extraction means, connected to said reception means, for extracting feature data from the input signal, the feature data being digital data and defining an input pattern vector f;
   feature data storage means, connected to said feature data extraction means, for storing the feature data;
   dictionary memory means for storing standard pattern data which defines predetermined standard pattern vectors $\phi$;
   digital arithmetic circuit means, connected to said feature data storage means and said dictionary memory means, for performing calculations in accordance with a multiple similarity method; and
   control/determination means for controlling an operation of said digital arithmetic circuit means and for recognizing and determining the input signal, based on the calculation result from said digital arithmetic circuit means and the multiple similarity method, wherein
   said digital arithmetic circuit means comprises:
   data bus means for transmitting data;
   first data selection means, connected to said feature data storage means and said data bus means, for outputting one of the feature data and data on said data bus means;
   second data selection circuit means, connected to said dictionary memory means, and said data bus means, for outputting one of the standard pattern data and data on said data bus means;
   first register circuit means, connected to said first data selection means, for storing output data from said first data selection means;
   second register circuit means, connected to said second data selection means, for storing output data from said second data selection means;
   partial product generating circuit means, connected to said first and second register circuit means, for sequentially generating and outputting partial products of the storage data in said first register circuit means and said second register circuit means, in accordance with a predetermined multiplication method;
   shift circuit means, connected to said partial product generating means, for shifting the partial products sequentially output from said partial product generating circuit means by a predetermined number of bits, according to the multiplication method, and sequentially outputting the shifted partial products;
   a digital adder circuit means, connected to said shift circuit means, for performing addition between data sequentially output from said shift circuit means and other data, and outputting the addition results onto said data bus means;
   third register circuit means, connected to said digital adder circuit means, for storing the output data from said digital adder circuit means; and
   third data selection circuit means, connected to said digital adder circuit means and said third register circuit means, for selecting one of the output data from said digital adder circuit means and the storage data in said third register circuit means, and supplying the selected data to said digital adder circuit means as the other data and, wherein
   said digital arithmetic circuit means performs at least a calculation of inner products of the input pattern vector (f(xr)) and the standard pattern vectors ($\phi^{(k)}n(xr)$) and a calculation of an accumulated value of squared values of the inner products;
   said first data selection circuit means sequentially outputs vector components of the input pattern vector f, and said second data selection circuit means sequentially outputs vector components of the standard pattern vector $\phi$, during the calculation of the inner products, and said first and second selection circuit means respectively output the inner products supplied from said digital adder circuit means, when calculating the squared values of the inner products;
   said partial product generating circuit means sequentially outputs partial products of vector components of the input pattern vector f and the standard pattern vector $\phi$ during the calculation of the inner products, and sequentially outputs the partial products of the inner products during the calculation of the squared values of the inner products; and
   said third data selection circuit means supplies the output data from said digital adder circuit means as the other data to said digital adder circuit means, to accumulate the partial products during the calculation of the inner products, when the inner products are calculated, said third data selection circuit means supplies storage data of said third register circuit means as said other data to said digital adder circuit means, and, after a sum of data of said third data selection circuit means and a first partial product of squared values of the inner products is output from said digital adder circuit means, the output data of said digital adder circuit means is supplied as said other data, and said third register circuit means holds an accumulated value of the squared values of the inner products output from said digital adder circuit means.

2. An apparatus according to claim 1, wherein said digital arithmetic circuit means performs a calculation for calculating the inner products of the input pattern vector and the standard pattern vectors and a calculation for calculating squared values of the calculated inner products during different periods.

3. An apparatus according to claim 1, wherein each time said digital adder circuit means completes a single addition, said partial product generating means outputs a next partial product.

4. An apparatus according to claim 1, wherein said digital adder circuit means comprises a first full adder for calculating predetermined upper bits of an addition result and a second full adder for calculating predetermined lower bits other than the upper bits of the addition result, and said first and second full adders are operated in a pipeline manner.

5. A pattern recognition apparatus comprising:
feature extraction means for receiving an input signal and extracting feature data from the input signal, the feature data being digital data and defining an input pattern vector f;
feature data storage means, connected to said feature data extraction means, for storing the feature data;
dictionary memory means for storing standard pattern data which defines predetermined standard pattern vectors $\phi$;
digital arithmetic circuit means, connected to said feature data storage means and said dictionary memory means, for calculating accumulated squared values ($S^{(K)}(f)$) of the inner products of the input pattern vector f and the standard pattern vectors $\phi$, and a product ($\theta \| f \|$) of the constant and a squared value of a norm of the input vector f, based on a multiple similarity method; and
determination means, connected to said digital arithmetic circuit means, for controlling an operation of said digital arithmetic circuit means and determining the input signal on the basis of the calculation results from said digital arithmetic circuit means.

6. A pattern recognition apparatus comprising:
reception means for receiving an input signal;
feature data extracting means, connected to said reception means, for extracting feature data from the input signal, the feature data being digital data and defining an input pattern vector;
feature data storage means, connected to said feature data extraction means, for storing the feature data;
dictionary memory means for storing standard pattern data which defines standard pattern vectors;
digital arithmetic circuit means for calculating an accumulated value of squared values of inner products of the input pattern vector and standard pattern vectors, and a product of a constant and a squared value of a norm of the input pattern vector to perform a similarity measure calculation in accordance with a multiple similarity method; and
determination means, connected to said digital arithmetic circuit means, for determining the input signal based on a calculation result from said digital arithmetic circuit means and the multiple similarity method, wherein
said digital arithmetic circuit means comprises:
data pass means for transmitting data;
data supply circuit means, connected to said feature data storage means, dictionary memory means and data pass means, for receiving data on said data pass means, said input pattern data, said standard pattern data and said constant and outputting two data which are to be multiplied;
partial product generating circuit means for sequentially generating and outputting partial products of the two data supplied from said data supply circuit means;
shift circuit means, connected to said partial product generating circuit means, for shifting the output data from said data supply circuit means in accordance with a multiplication method;
adder circuit means, connected to said shift circuit means, for adding the output data from said shift circuit means and other data, and outputting the addition result onto said data pass means;
register circuit means for storing the output data from said adder circuit means;
data selection circuit means for selecting one of the output data from said register circuit means and the output data from said adder circuit means, and supplying the selected data to said adder circuit means as said other data; and
control means, connected to said data pass means, said data supply circuit means, said partial product generating circuit means, said shift circuit means, said adder circuit means, said register circuit means, and said data selection circuit means, for controlling operations thereof.

7. The apparatus of claim 6 wherein said means for calculating an accumulated value of the squared values of inner products of the input pattern vector and standard pattern vectors, and a product of a constant and a squared value of a norm of the input pattern vector to perform a similarity measure calculation in accordance with a multiple similarity method further comprises:
means for calculating an inner product of the input pattern vector and standard pattern vector, wherein said control means causes said data supply circuit means to select the input pattern data and said standard pattern data and output the selected data as said two data, and causes said data selection circuit means to select the output data from said adder circuit means and supply the selected data to said adder circuit means;
means for calculating an accumulated value of squared values of the inner products, when said adder circuit means outputs said inner product, wherein said control means causes said data supply circuit means to select an inner product on said data pass means and supply the inner product as said two data to said partial product generating circuit means, causes said data selection circuit means to select the data stored in said register circuit means, causes said adder circuit means to calculate a sum of the accumulated value of the squared values which have been stored in said register circuit means and the first partial product of the squared value of the inner products, selects the output data from said adder circuit means, and accumulates the partial products of the squared values of the inner products in addition to the accumulated value of the squared values which have been stored in said register circuit means, and causes said register circuit means to store the output data from said adder circuit means when said adder circuit means outputs a new accumulated value of the squared values of the inner products;
means for calulating the squared value of the norm, wherein said control means causes said data supply circuit means to sequentially output said input pattern data as said two data onto said data supply circuit means, and causes said data selection circuit means to select the output data from said adder circuit means; and means for calculating a product of the constant and the squared value of the norm, wherein said control means causes said data supply circuit means to output data on said data pass means and said constant as said two data when said adder circuit means outputs the squared value of the norm of the input pattern vector and causes said data selection circuit means to select the output data from said adder circuit means and supply the selected data to said adder circuit means.

8. A pattern recognition apparatus comprising:

reception means for receiving an input signal;

feature data extraction means, connected to said reception means, for extracting feature data, from the input signal, the feature data constituting an input pattern vector;

feature data storage means, connected to said feature data extraction means, for storing the feature data;

dictionary memory means for storing standard pattern data constituting predetermined standard pattern vectors;

digital arithmetic circuit means for performing accumulation of squared values of inner products of the input pattern vector f and the standard pattern vectors $\phi$, and a calculation of a product of a constant and a squared value of the norm of the input pattern vector f based on a multiple similarity method by an identical arrangement during different periods; and control/recognition means, connected to said digital arithmetic circuit means, for controlling an operation of said digital arithmetic circuit means and recognizing a pattern of the input signal, based on the calculation results from said digital arithmetic means and on use of the multiple similarity method.

9. An apparatus according to claim 8, wherein each time said digital adder circuit means completes a single addition, said partial product generating means outputs a partial product.

10. An apparatus according to claim 8, wherein said digital adder circuit means comprises a first full adder for upper bits and a second full adder for lower bits, and said first and second full adders are operated in a pipeline manner.

* * * * *